US006833199B2

(12) United States Patent
Fujita et al.

(10) Patent No.: US 6,833,199 B2
(45) Date of Patent: Dec. 21, 2004

(54) JOINED STRUCTURE OF DIFFERENT METAL MATERIALS

(75) Inventors: Masashi Fujita, Wako (JP); Masayuki Narita, Wako (JP); Yasuyuki Hama, Wako (JP); Kenji Ikeuchi, Kyoto (JP); Makoto Takahashi, Toyonaka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 168 days.

(21) Appl. No.: 10/195,328

(22) Filed: Jul. 16, 2002

(65) Prior Publication Data

US 2003/0031892 A1 Feb. 13, 2003

(30) Foreign Application Priority Data

| Jul. 16, 2001 | (JP) | 2001-215230 |
| Aug. 6, 2001 | (JP) | 2001-237766 |
| Aug. 6, 2001 | (JP) | 2001-237790 |
| Aug. 8, 2001 | (JP) | 2001-240494 |

(51) Int. Cl.[7] ............... B32C 15/01; B23K 20/12
(52) U.S. Cl. ............ 428/615; 428/629; 428/653; 428/612; 428/926; 228/112.1; 228/114
(58) Field of Search .............. 428/615, 653, 428/926, 629, 612; 228/112.1, 113, 114, 114.5, 115, 116

(56) References Cited

U.S. PATENT DOCUMENTS

| 3,753,286 A | * | 8/1973 | Lilly et al. ............... 228/112.1 |
| 3,857,163 A | * | 12/1974 | Hirschfield et al. ......... 228/164 |
| 4,985,310 A | * | 1/1991 | Agarwala et al. ........... 428/620 |
| 5,897,963 A | * | 4/1999 | Seuntjens .................... 428/607 |
| 2002/0009610 A1 | * | 1/2002 | Shimokawa et al. ........ 428/647 |
| 2003/0031892 A1 | * | 2/2003 | Fujita et al. ................ 428/653 |
| 2003/0089432 A1 | * | 5/2003 | Carey et al. ................ 148/527 |

FOREIGN PATENT DOCUMENTS

JP  2001-205449  * 7/2001

* cited by examiner

*Primary Examiner*—John J. Zimmerman

(57) ABSTRACT

A joined structure has high strength, which is used for manufacturing a joint made from different metal materials. In the joined structure in which the different metal materials are joined, a reaction product layer to be generated on the joined interface is set to have a thickness of 0.5 μm or less. Moreover, the reaction product layer is allowed to intermittently exist on the joined interface. Furthermore, the reaction product layer contains a base material crystal consisting of base material atoms of 90 atom % or more on the joined interface.

16 Claims, 20 Drawing Sheets

Jointed interface

Jointed interface

500nm

50nm

500nm

JOINED STRUCTURE OF DIFFERENT METAL MATERIALS

BACKGROUND OF THE INVENTION

1. Field of the Invention

The present invention relates to a joined structure of different metal materials that are combined in such a manner as to form a fragile reaction product layer at a joined interface, such as a directly joined structure between a steel product and an aluminum alloy.

2. Description of the Related Art

In general, different metal materials tend to metallurgically form very fragile intermetallic compounds. In the case of the use of a normal melt joining process, since the two materials are mixed in a liquid state, a large amount of fragile reaction product (intermetallic compound) is formed on a melt-joined metal portion, failing to provide a joint having an appropriate strength. In contrast, in the case of application of a solid-phase joining method, it is possible to reduce the generation of a reaction product in comparison with the melt joining method; therefore, various joining methods of this type have been proposed.

However, the joining mechanism, that is, the relationship between the joined interface structure and the joining strength, has not been clarified, and at present, this method does not provide joints having high strength.

SUMMARY OF THE INVENTION

The present invention has been devised to solve the above-mentioned problems, and an object thereof is to provide a joined structure having a high strength upon manufacturing a joint made of different metal materials by taking into consideration the generation state of reaction products at the joining interface.

One aspect of the joined structure of different metal materials of the present invention is characterized in that, in a joined structure different metal materials, the thickness of a reaction product layer to be generated at the joined interface is set to be 0.5 $\mu$m or less.

Another aspect of the joined structure of different metal materials of the present invention is characterized in that a reaction product layer is located at the joined interface intermittently.

Moreover, another aspect of the joined structure of different metal materials of the present invention is characterized in that a base material crystal consisting of base material atoms of 90 atom % or more is contained in the reaction product layer generated at the joined interface. Moreover, another aspect of the joined structure of different metal materials of the present invention is characterized in that the base material crystal penetrates the reaction product layer.

Furthermore, another aspect of the joined structure of different metal materials of the present invention is characterized in that an oxide layer is placed at the joined interface by taking the effectiveness of the oxide layer at the joined interface into consideration. In another aspect of the present invention, the thickness of the oxide layer is limited to a range of 1 to 30 nm so as to more preferably obtain a joined structure having high strength.

The reaction product of the present invention is generated by a diffusion reaction of mutually joined material atoms at the joined interface, and in the case of a combination of different metal materials, in general, an intermetallic compound which is more fragile than the base material is formed. Moreover, in most cases, the structure is a polycrystal structure, and the generation state, which differs depending on joining methods and joining conditions, is rate-controlled by a diffusion reaction; therefore, the amounts generated become greater as the reaction temperature and time increase. When this reaction product layer is formed excessively, a large area having low toughness tends to spread on the joined interface, resulting in an increase in the probability of rupture in response to loads; consequently, the joint is easily damaged.

In the present invention, the oxide layer refers to a residual oxide layer at the surface of the joining members or an oxide layer generated during the joining process, and the two members are joined to each other through the oxide layer on the joining interface. This oxide layer must have a thin structure to a degree so as not to exert adverse effects on the welding properties and the joining strength between the two joining members. Without the presence of this oxide layer, when the surfaces of the members that have been sufficiently cleaned are made to contact with each other during a solid-phase joining process, the base material atoms of the two joining members will mutually diffuse, easily forming a very fragile reaction product layer.

The rupturing conditions of the joints are determined by the balance between the probability of cracks occurring and developing in the reaction product layer having low toughness and the probability of these occurring and developing in the base material having high ductility. In other words, in order to increase the strength of the joining portion, it is possible to lower the probability of rupturing inside the reaction product layer by reducing the amount of generation of the reaction product layer having low toughness. When the probability of rupturing inside the reaction product layer is set to be lower than that in the joining base material, the rupturing does not occur in the joining interface, but in the joining base material. In other words, such a joint is less susceptible to rupturing inside the reaction product layer, and it has high strength.

Therefore, the joined structure of different metal materials in the present invention is formed as a joined structure, shown in the respective embodiments in FIGS. 1 to 4, so that it becomes possible to achieve the formation of joints having high strength. The following description will explain the respective embodiments of the joined structures of different metal materials of the present invention in detail.

(1) First Embodiment

As shown in FIG. 1, a joined structure of different metal materials of the first embodiment of the present invention, which is a joined structure between a first member 1 and a second member 2 that generates a fragile reaction product layer at the joined interface, is characterized in that the generation of the reaction product having low toughness at the joining interface is reduced to a minimum, with the thickness of the reaction product layer 3 being set to 0.5 $\mu$m or more; thus, it becomes possible to reduce the probability of the generation of cracks (probability of rupturing) inside the layer to be set to not more than the probability of rupturing inside the second member serving as a joining base material, and consequently, to provide a joint with high strength that is less susceptible to rupturing at the joined interface.

(2) Second Embodiment

As shown in FIG. 2, a joined structure of different metal materials of the second embodiment of the present invention, which is a joined structure between a first member 1 and a second member 2 that generates a fragile reaction product layer on the joined interface, is characterized in that the generation of the reaction product having low toughness at the joining interface is reduced to a minimum, with the reaction product layer 3 being located intermittently; thus, cracks generated inside the reaction product having low toughness are stopped by the base material having high ductility in the intermittent portions; therefore, it becomes possible to reduce the probability of rupturing thereof to be not more than the probability of rupturing inside the joined base material; and consequently, it becomes possible to provide a joint with high strength that is less susceptible to rupturing from the joined interface. Moreover, with respect to the intermittence of the reaction product layer of the present invention, a proper distance capable of maintaining a sufficient ductility portion is provided so as to stop cracks occurring inside the reaction product layer.

(3) Third Embodiment

As shown in FIG. 3, a joined structure of different metal materials of the third embodiment of the present invention, which is a joined structure between a first member 1 and a second member 2 that generates a fragile reaction product layer at the joined interface, is characterized in that the generation of the reaction product having low toughness at the joining interface is reduced to a minimum, with a base material crystal 4 containing 90 atom % or more of the base material atoms being located in the reaction product layer 3. More preferably, the base material crystal 4 exists so as to penetrate the reaction product layer 3. Since this base material crystal contains 90 atom % or more of the base material atoms, it is allowed to have virtually the same ductility as the joining base material. With this arrangement, cracks occurring in the reaction product having low toughness are stopped by this base material crystal so that the probability of rupturing in this joining interface is reduced to not more than the probability of rupturing inside the joining base material; thus, it becomes possible to obtain a joint having high strength that is less susceptible to rupturing from the joined interface.

(4) Fourth Embodiment

As shown in FIG. 4, a joined structure of different metal materials of the fourth embodiment of the present invention, which is a joined structure between a first member 1 and a second member 2 that generates a fragile reaction product layer on the joined interface, is characterized in that, when the mutual diffusing coefficient of the main element of an oxide layer 5 located on the interface is less than the mutual diffusing coefficients in both of the base materials, this oxide layer 5 has an effect for suppressing the generation of the reaction product at the joined interface; therefore, by placing a very thin oxide layer 5 at the joined interface, atom diffusions from both of the joining members are suppressed, with the result that the generation and development of a fragile reaction product which would be formed at the interface are suppressed, so that it becomes possible to obtain a joined structure with high strength made of different metal materials. In order to obtain a sufficient function of this oxide layer serving as an atom diffusion barrier, the thickness of the layer must be set to at least 1 nm.

Here, in the case in which an oxide layer is formed at the joined interface, the thickness of the oxide layer exceeding 30 nm sometimes causes degradation in the welding properties of the joining members, and generates and develops cracks inside the oxide layer that is more fragile than the base material. Therefore, it is necessary to make the oxide layer of the joining members thin to a degree so as not to cause adverse effects on the welding properties and the toughness of the joined interface; thus, it is possible to function as an atom diffusion barrier to both of the joining members, and consequently to reduce the formation and development of the interface reaction layer. Therefore, in the present invention, the thickness of the oxide layer is preferably set in a range of 1 to 30 nm. In this case, a reaction product which is sufficiently small to a degree so as not to yield adverse effects on the joining strength may exist in contact with the oxide layer.

(5) Formation of a Joined Interface

The joined structures of different metal materials of the respective embodiments having the above-mentioned joined interfaces are formed by, for example, a friction welding method, which is one type of solid-phase joining method. In the frictional process, the surface of the joining member is mechanically cleaned, and in the succeeding upset process, reaction products generated at the joined interface are externally discharged, thereby completing welding of both of the joining members. If the frictional process is carried out insufficiently, the joining faces are not sufficiently cleaned, causing a state in which stains and residual oxides are excessively left at the joining faces and results in failure in providing a desirable adherence in the succeeding upset process. In contrast, if the frictional process is excessively carried out, although the joining faces are sufficiently cleaned, too much input heat is given to the joining members, causing the reaction product layer to grow extremely in the upset process.

Moreover, in the fourth embodiment, with respect to the means for providing a thin oxide layer on the joined interface, a method in which only one of the oxide layers is removed from the oxide layers existing on the surfaces of both of the base materials before the joining operation is proposed. In accordance with this method, it is possible to obtain a joined interface having a thinner oxide layer in comparison with the case in which oxide layers exist on the surfaces of both of the base materials. Moreover, in the above-mentioned method, only one of the oxide layers that is thicker may be preferably removed. With this arrangement, it is possible to obtain a joined interface having a thinner oxide layer in comparison with the cases in which oxide layers exist on the surfaces of both of the base materials and only the thicker oxide layer remains.

With respect to the means for removing only one of the oxide layers of the base materials, before the joining process or during the joining process, a mechanical means such as grinding, rubbing, and sliding, a physical means such as sputtering, or a chemical means such as reduction, may be used, and after this process, making the cleaned face without the oxide layer and a joining face bearing a thin oxide layer in contact with each other to such a degree as to exert a bonding strength between the atoms on both of the joined faces; thus, it is possible to form the joined structure of different metal materials of the present invention. Moreover, the oxide layer of the present invention may be reduced by active elements contained in the joined members during the joining process so that an oxide layer newly containing the active elements is formed.

(6) Confirmation of the Joined Structure

In the joined structure of different metal materials of the present invention, the fact that the members of different metals are in a joined state can be observed and confirmed through a microscopic observation to detect the existence of a reaction product layer made of an intermetallic compound at the joined interface; therefore, it is possible to eliminate the need for complex strength tests and inspections.

BRIEF DESCRIPTION OF THE DRAWINGS

FIG. 21A is further enlarged.

DETAILED DESCRIPTION OF THE INVENTION

Referring to embodiments, the following description will explain the present invention in detail.

(1) First Embodiment
Consideration on Friction Time

Figure 1:
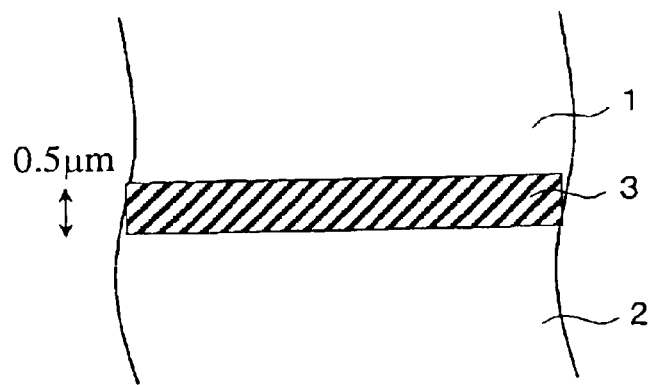
FIG. 1 is a cross-sectional view schematically showing a joined structure of different metal materials in accordance with the first embodiment of the present invention.
Figure 2:
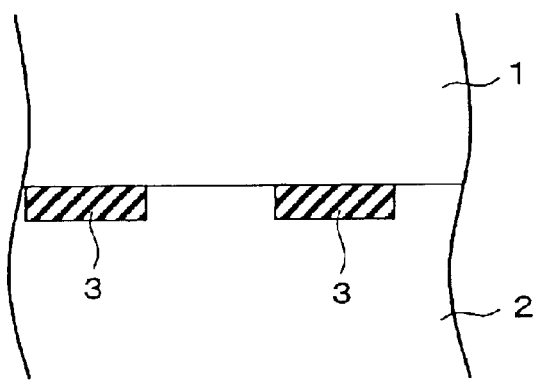
FIG. 2 is a cross-sectional view schematically showing a joined structure of different metal materials in accordance with the second embodiment of the present invention.
Figure 3:
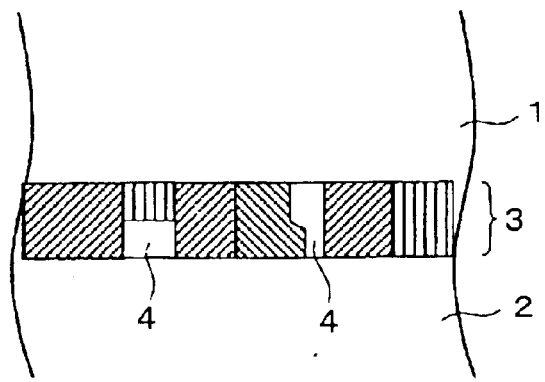
FIG. 3 is a cross-sectional view schematically showing a joined structure of different metal materials in accordance with the third embodiment of the present invention.
Figure 4:
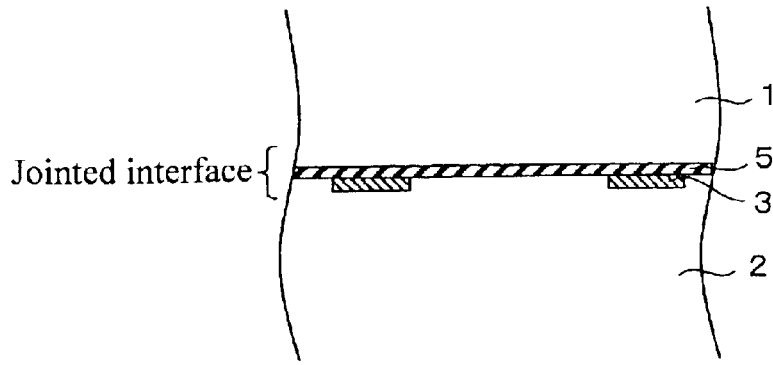
FIG. 4 is a cross-sectional view schematically showing a joined structure of different metal materials in accordance with the fourth embodiment of the present invention.
Figure 5:
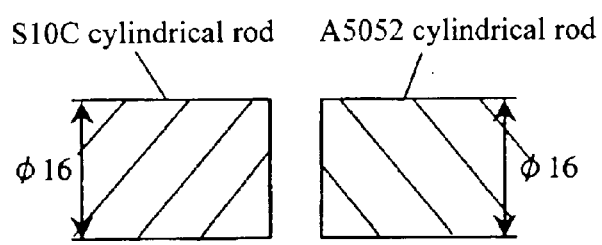
FIG. 5 is a cross-sectional view of cylindrical rods that are used for forming a joined structure between a steel product and an aluminum alloy.
Figure 6:
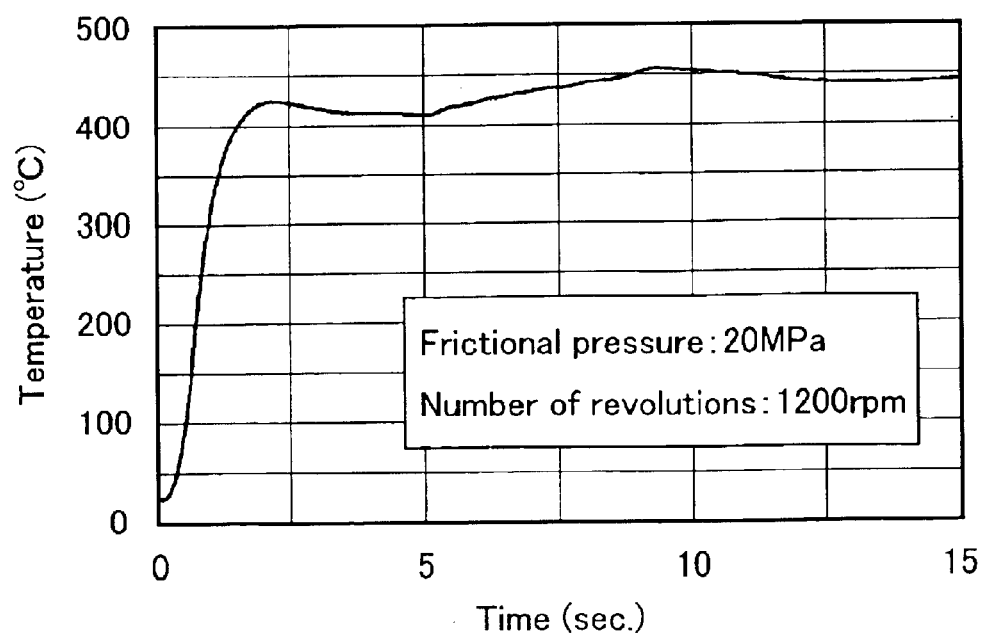
FIG. 6 is a graph showing the relationship between the friction time and the temperature in the vicinity of the joined interface in a friction process between the steel product and the aluminum alloy.

In order to obtain the joined interface of the present invention, the growth of the reaction product layer must be suppressed to a minimum by optimally controlling the input to be given during a friction process. Therefore, a steel product (material: JIS S10C) and an aluminum alloy (material: JIS A5052), which have chemical components shown in Table 1, were formed into a cylindrical steel rod having an outer diameter of 16 mm and a predetermined length and a cylindrical aluminum alloy rod having an outer diameter of 16 mm and a predetermined length, as shown in FIG. 5, so that test pieces were prepared. With respect to these test pieces, the relationship between the friction time and the temperature in the vicinity of the joined interface in a friction process between the steel product and the aluminum alloy was observed under the conditions of a frictional pressure of 20 MPa and number of revolutions of 1200 rpm. As a result, the temperature distribution as shown in FIG. 6 was obtained. As is clearly shown in FIG. 6, a stable temperature in the vicinity of the joined face was obtained in approximately 3 seconds of friction time. In other words, with respect to the friction welding between the steel product and the aluminum alloy, it was found that a friction time of approximately 3 seconds makes it possible to clean the joined face sufficiently. Moreover, when the frictional heat input was increased by raising the frictional pressure, friction time, etc., above this state, the reaction product layer developed in accordance with the input quantity of heat, resulting in degradation in the joint strength. Consequently, by carrying out a pressure welding process after a short period of friction process, the input quantity of heat to the joined interface is limited to a minimum and the growth of the reaction product layer is reduced to a minimum; thus, it becomes possible to obtain a joint having high strength.

Evaluation of Joint Strength

Figure 8:
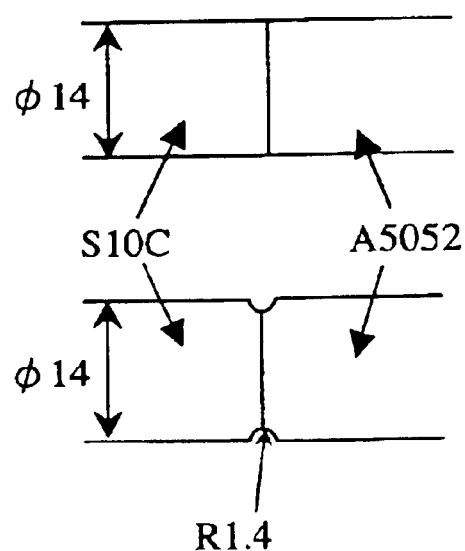
FIG. 8 is a cross-sectional view of test pieces used for evaluating the joining strength of a joined structure between a steel product and an aluminum alloy.

The above-mentioned flange on the joined portion was ground, and the circumference of the joined structure was ground to form a smooth surface so that test pieces each having an outer size of 14 mm, as shown in FIG. 8, were prepared. Moreover, notches having a depth of 1.4 mm were formed on the circumferential surface of the joined interface so that test pieces each having a stress concentration rate of 2.0 were also prepared. These test pieces with notches were used so as to carry out more strict evaluation on the joined interface. Each of these test pieces was pulled in the length direction so that the joint strength was evaluated.

Figure 9:
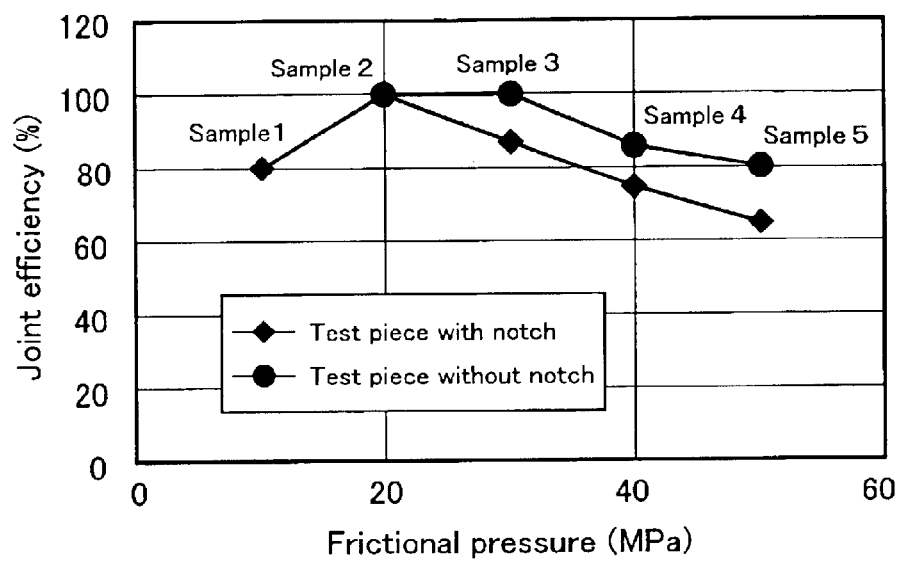
FIG. 9 is a graph showing the relationship between the frictional pressure and the joint efficiency in the forming process of a joined structure between a steel product and an aluminum alloy.

The results of the joint strength evaluation of these joined structures are shown in FIG. 9 as rates (%) of the aluminum member with respect to the base material strength. In the case of sample 1 having a frictional pressure of 10 MPa, the joint strength was low, because the joined face was not cleaned sufficiently and welding between the joined members was insufficient. In contrast, in the case of samples 2 and 3 having a frictional pressure of 20 to 30 MPa, the joint strength was the same as the base material strength of the aluminum member. In the case of the samples 4 and 5 having a frictional pressure exceeding 30 MPa, since the product layer grew on the joined interface, the joint strength was reduced in response to the degree of the growth. Moreover, in the case of evaluation using the test pieces with notches also, with respect to sample 2, the joint strength was the same as the base material strength of the aluminum member.

Evaluation on Interface Structure

Figure 10:
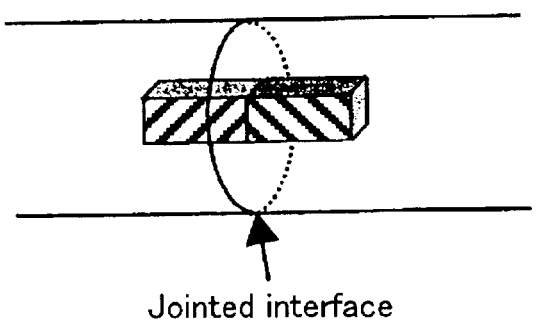
FIG. 10 is a cross-sectional view of a test piece used for evaluating the interface structure of a joined structure between a steel product and an aluminum alloy.

Moreover, each of the joined structures of samples 1 to 5 obtained as described above was cut in the vertical direction with respect to the joined face as shown in FIG. 10, and the cut surface was mechanically polished by using a polishing disk having diamond abrasive grains having a maximum particle size of 3 μm. Next, in order to obtain a proper permeability of electrons, they were preliminarily subjected to electrolytic polishing in an acidic solution and then they were subjected to a sputtering process by Ar atoms in a vacuum. The samples having been subjected to these processes were observed under a TEM (transmission-type elec-

TABLE 1

| | (weight %) | | | | | | | | | | |
|---|---|---|---|---|---|---|---|---|---|---|---|
| Material | C | Si | Mn | Cu | Mg | P | S | Ni | Cr | Zn | Fe | Al |
| S10C | 0.11 | 0.16 | 0.33 | 0.01 | — | 0.014 | 0.015 | 0.04 | 0.08 | — | Remainder | — |
| A5052 | — | 0.07 | 0.01 | 0.01 | 2.60 | — | — | — | 0.26 | 0.01 | 0.21 | Remainder |

Preparation of Samples 1 to 5

Next, by setting the frictional pressure respectively to 10, 20, 30, 40, and 50 MPa under the conditions of number of revolutions of 1200 rpm, friction time of 3 seconds, upset pressure of 250 MPa, and upset time of 6 seconds, the test pieces of the above-mentioned cylindrical steel product rod and the cylindrical aluminum alloy rod were friction-welded each other to prepare a joined structure of a steel product and an aluminum alloy of each of samples 1 to 5. Here, the friction welding process between the cylindrical steel product rod and the cylindrical aluminum rod was carried out by using a conventional brake method.

Figure 7:
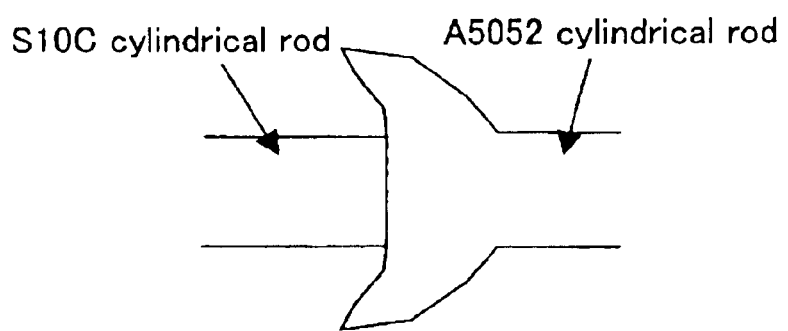
FIG. 7 is a cross-sectional view of one embodiment of a joined structure between a steel product and an aluminum alloy.
Figure 11A:
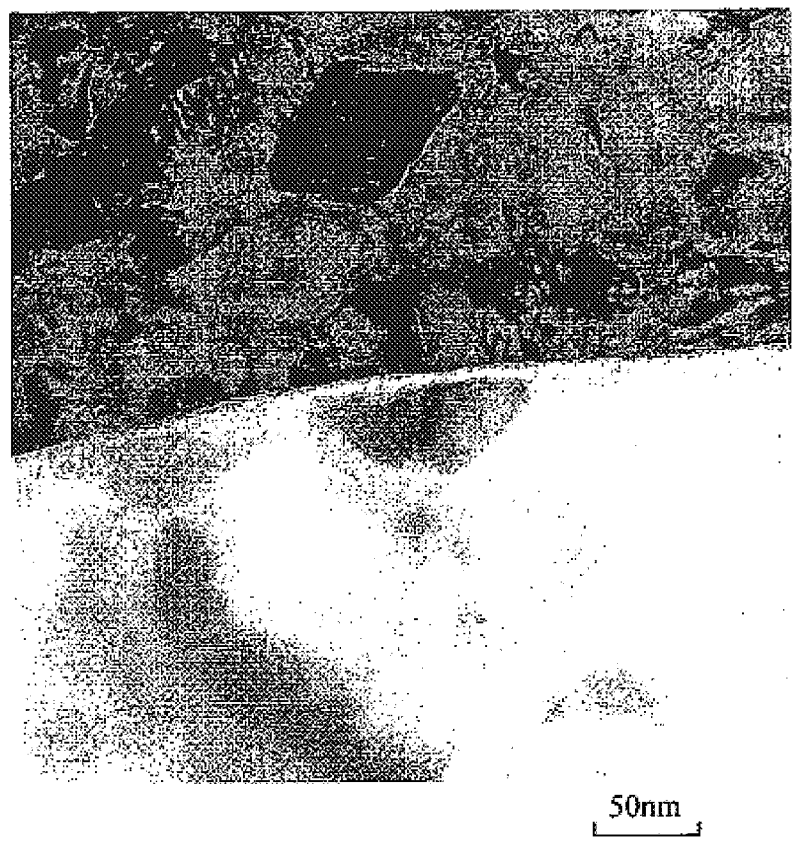
FIG. 11A is an electron microscopy photograph that shows a joined interface of a joined structure between a steel product and an aluminum alloy which is an example of a joined structure of different metal materials in accordance with the first embodiment of the present invention.
Figure 11B:
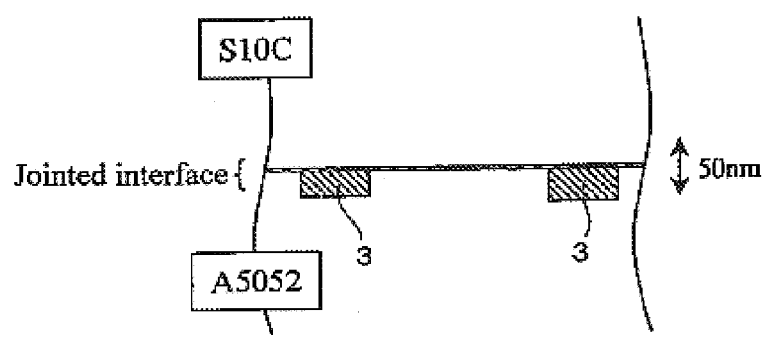
FIG. 11B is a schematic drawing showing the above-mentioned structure.
Figure 12A:
FIG. 12A is an electron microscopy photograph showing a joined interface of a conventional joined structure between a steel product and an aluminum alloy.
Figure 12B:
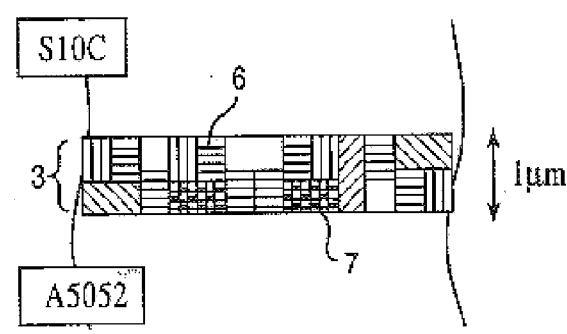
FIG. 12B is a schematic drawing showing the above-mentioned structure.

As shown in FIG. 7, with respect to the joined structure of the steel product and the aluminum alloy thus obtained, the cylindrical aluminum alloy rod side having a lower strength was deformed greatly in a cross-section of the joined portion and was discharged externally as a flange.

tron microscope). With respect to samples 2 and 5, the resulting images thereof are shown in FIGS. 11A and 12A, respectively. Here, the magnifications of the respective electron microscopy photographs were respectively set to 150,000 times and 20,000 times. FIGS. 11B and 12B are drawings that schematically show these images.

In sample 2 shown in FIGS. 11A and 11B, the reaction product layer 3 was formed by a reaction product generated on the joined interface, and specifically, it was formed by crystals of an intermetallic compound mainly composed of Fe/Al. The crystals have a width of about 100 nm and a thickness of 50 nm, and they are located in the form of dots along the joined interface. Moreover, in some cases, a very thin oxide layer was located on the steel product side in the joined interface. When the thickness of the reaction product on the joined interface is very thin as described above, it is possible to form a joined structure having a high strength that is the same level of strength as the aluminum alloy member as shown in FIG. 9, since the probability of cracks developing therein is very low.

In sample 5 shown in FIGS. 12A and 12B, an area indicated by reference numeral 6 shows a typical reaction product in which crystal grains having a thickness of approximately 200 nm have developed in the vertical direction with respect to the joined interface. Moreover, as indicated by reference numeral 7, an area in which very fine crystal grains are dispersed as dots is also observed. These crystals of the reaction product are continuously developed on the joined interface without any gaps. The thickness of the reaction product layer containing these crystal grains is varied in a range between 0.8 to 1.5 $\mu$m due to the sizes of the grains and local variations. In the case of a joined structure having an interface structure of this type, there is a higher probability of cracks occurring within the intermetallic compound layer having a low value of toughness to rupture, and a crack, once it forms, is preferentially transmitted through the intermetallic compound layer continuously to cause damage; consequently, this joined structure has a lower strength than that of the joined structure of sample 2 shown in FIGS. 11A and 11B.

Figure 13:
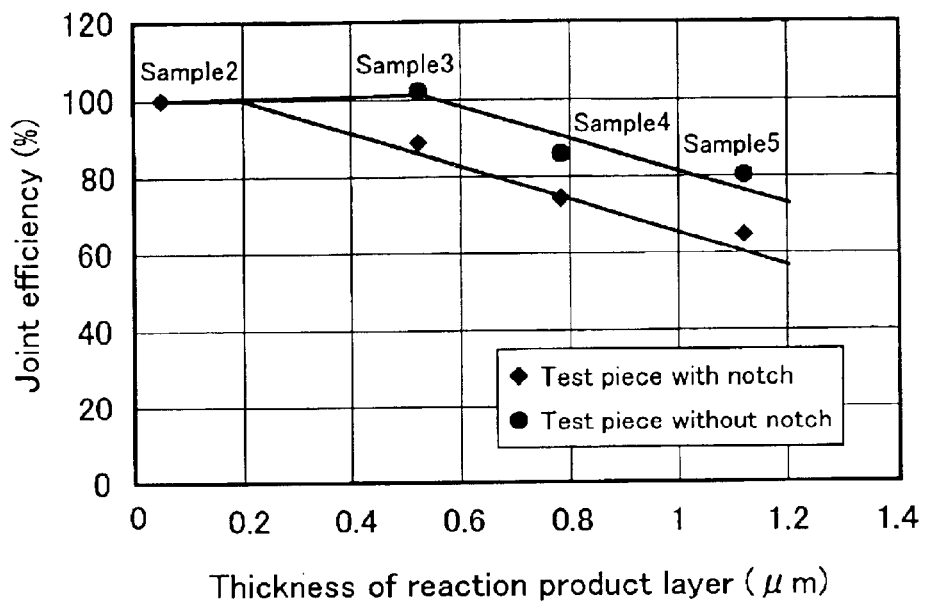
FIG. 13 is a graph showing the relationship between the thickness of a reaction product layer and the joint efficiency in a joined structure between a steel product and an aluminum alloy.

Moreover, with respect to samples 1 to 5, the relationship between the thickness of a reaction product layer and the joint efficiency in a joined structure between a steel product and an aluminum alloy was observed, and the results are shown in FIG. 13. As is clearly shown in FIG. 13, it was found that as the thickness of the reaction product layer decreases, the joint strength increases, so that a joint having the same strength as the aluminum alloy member is obtained when the thickness of the reaction product layer is 0.5 $\mu$m or less in the case of smooth materials, or when the thickness of the reaction product layer is 0.2 $\mu$m or less in the case of materials with notches due to an increase in the probability of rupturing within the interface layer caused by stress concentration.

Therefore, it is confirmed that in the joined structure of a steel product and an aluminum alloy, it is possible to obtain a joint having high strength that is less susceptible to rupturing from the joined interface, when the thickness of the reaction product layer having a low toughness to be generated at the joined interface is set to be 0.5 $\mu$m or less or when it is set to be 0.2 $\mu$m or less in the case of test pieces with notches.

(2) Second Embodiment

Consideration on Friction Time

In order to obtain the joined interface of the present invention, the growth of the reaction product layer must be reduced to a minimum level by starting the upset process immediately after the minimum input required for cleaning the joined interface has been given during a friction process to remove stains, oxides, etc., from the joined face. Therefore, a steel product (material: JIS S10C) and an aluminum alloy (material: JIS A5052), which have chemical components shown in Table 1, were formed into a cylindrical steel rod having an outer diameter of 16 mm and a predetermined length and a cylindrical aluminum alloy rod having an outer diameter of 16 mm and a predetermined length, as shown in FIG. 5, so that test pieces were prepared. With respect to these test pieces, the relationship between the friction time and the temperature or the torque in the vicinity of the joined interface in a friction process between these test pieces was observed under the conditions of a frictional pressure of 30 MPa and number of revolutions of 1200 rpm. As a result, the temperature and torque history as shown in FIG. 14 was obtained.

Figure 14:
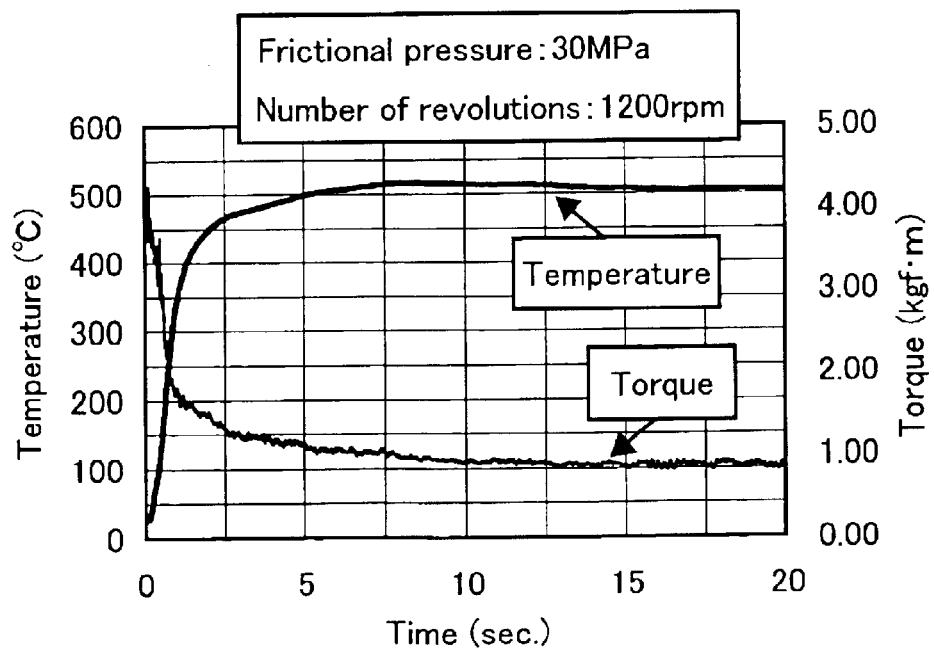
FIG. 14 is a graph showing the relationship among the friction time, the temperature in the vicinity of the joined interface, and the torque in a friction process between the steel product and the aluminum alloy.

As is clearly shown in FIG. 14, a stable temperature and a torque in the vicinity of the joined face were obtained in approximately 3 seconds of friction time. In other words, with respect to the friction welding between the steel product and the aluminum alloy, it was found that a friction time of approximately 3 seconds makes it possible to clean the joined face sufficiently, and a reaction product layer starts to be partially generated at the joined interface. Moreover, when the frictional heat input was increased by raising the frictional pressure, friction time, etc., above this state, the reaction product layer was developed in accordance with the input quantity of heat, resulting in degradation in the joint strength. Consequently, by carrying out a pressure welding process after a short period of friction process, the input quantity of heat to the joined interface is limited to a minimum and the growth of the reaction product layer is reduced to a minimum; thus, it becomes possible to obtain a joint having high strength.

Preparation of Samples 6 to 8

Next, by setting the frictional pressure respectively to 30, 40, and 50 MPa under the conditions of number of revolutions of 1200 rpm, friction time of 3 seconds, upset pressure of 250 MPa, and upset time of 6 seconds, the test pieces of the above-mentioned cylindrical steel product rod and the cylindrical aluminum alloy rod were friction-welded each other to prepare a joined structure of a steel product and an aluminum alloy of each of samples 6 to 8. Here, the friction welding process between the cylindrical steel product rod and the cylindrical aluminum rod was carried out by using a conventional brake method.

As shown in FIG. 7, with respect to the joined structure of the steel product and the aluminum alloy thus obtained, the cylindrical aluminum alloy rod side having a lower strength was deformed greatly in a cross-section of the joined portion and was discharged externally as a flange.

Evaluation of Joint Strength

The above-mentioned flange on the joined portion was ground, and the circumference of the joined structure was ground to form a smooth surface so that test pieces each having an outer size of 14 mm without a notch, shown at the upper side in FIG. 8, were prepared. Each of these test pieces was pulled in the length direction so that the joint strength was evaluated.

Figure 15:
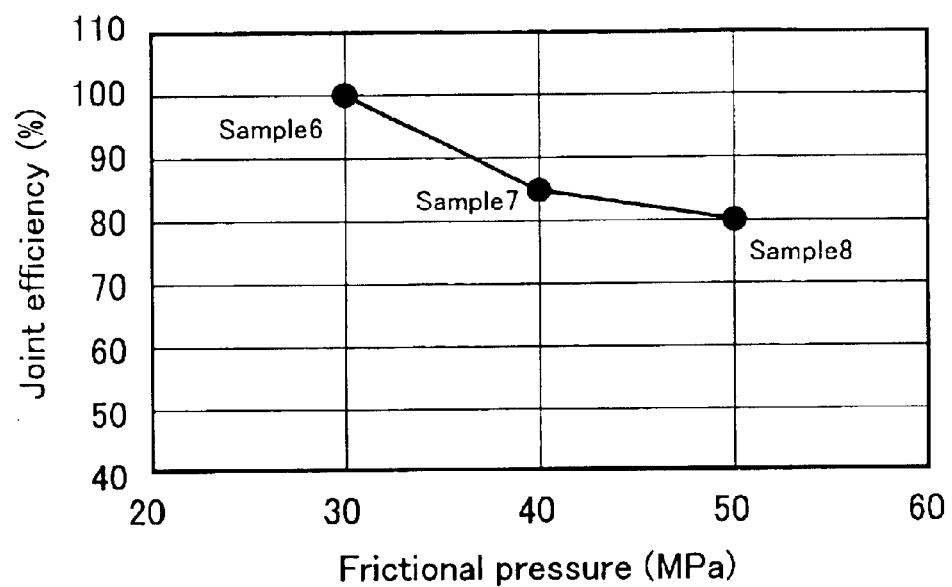
FIG. 15 is a graph showing the relationship between the frictional pressure and the joint efficiency in the forming process of a joined structure between a steel product and an aluminum alloy.

The results of the joint strength evaluation of these joined structures are shown in FIG. 15 as rates (%) of the aluminum member with respect to the base material strength. In the case of sample 6 having a frictional pressure of 30 MPa, the joint strength was the same as the base material strength of the aluminum member. In contrast, in the cases of samples 7 and 8 having increased frictional pressures of 40 and 50 MPa, the reaction product layer continuously grew too much due to an increase in the input quantity of heat resulting from the increase in the frictional pressure, causing degradation in the joint strength in response to the increase in the frictional pressure.

Evaluation on Interface Structure

Figure 16A:
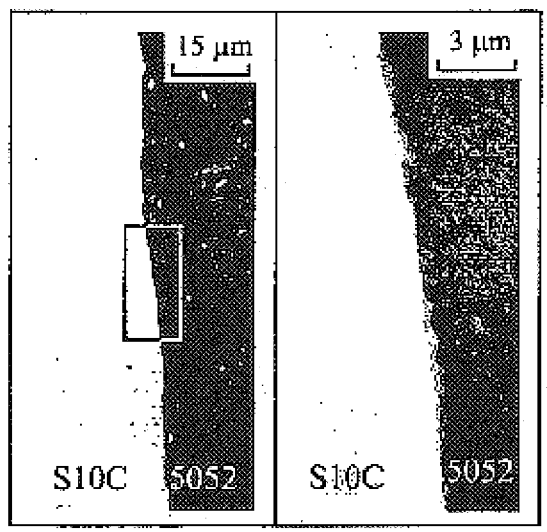
FIG. 16A is an electron microscopy photograph showing a joined interface of a joined structure between a steel product and an aluminum alloy which is an example of a joined structure of different metal materials in accordance with the second embodiment of the present invention.

Moreover, each of the joined structures of samples 6 to 8 obtained as described above was cut in the vertical direction with respect to the joined face as shown in FIG. 10, and the cut surface was mechanically polished by using a polishing disk having diamond abrasive grains having a maximum particle size of 0.25 $\mu$m. Samples 6 to 8 which were subjected to these processes were observed under a SEM (scanning-type electron microscope), and the results of the observations are shown in FIGS. 16A, 17A, and 18A, respectively. Here, the magnification of the electron microscopy photographs on the left was set to 800 times, and the photographs on the right were obtained by further magnifying the framed portion in the center of each photograph by 5 times. Moreover, FIGS. 16B, 17B, and 18B are drawings that schematically show these images.

Figure 16B:
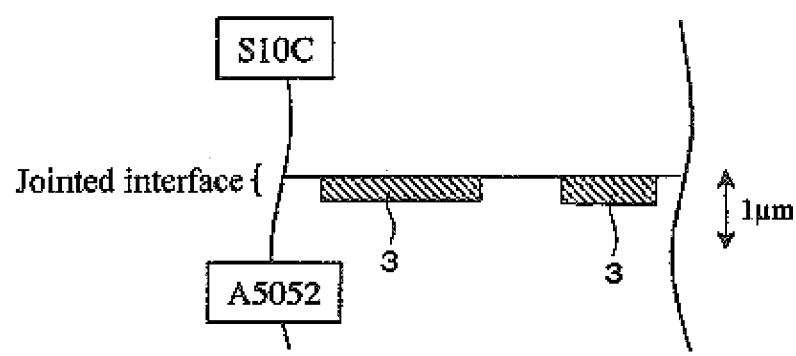
FIG. 16B is a schematic drawing showing the above-mentioned structure.
Figure 17A:
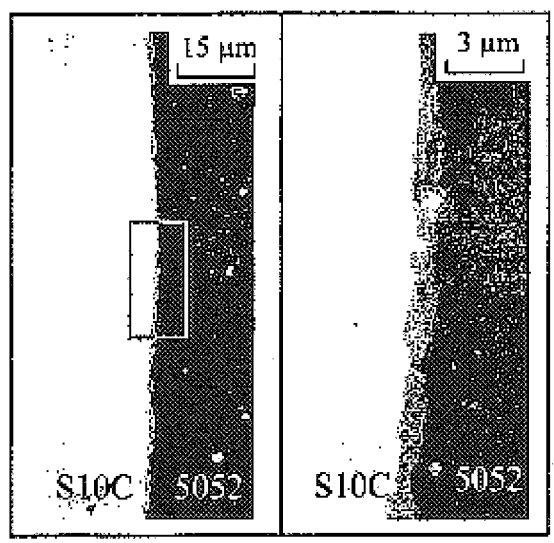
FIG. 17A is an electron microscopy photograph showing joined interface of a conventional joined structure between a steel product and an aluminum alloy.

In sample 6 shown in FIGS. 16A and 16B, it was confirmed that aggregates of the reaction product made from fine crystal grains of an intermetallic compound mainly composed of Fe/Al were intermittently formed in parallel with the joined interface. Therefore, in sample 6, since the reaction product layer 3 on the joined interface was intermittently formed, even if a crack occurs within the reaction product layer 3 having a low value of toughness to rupture, the development of the crack is stopped by the aluminum alloy located intermittently in the reaction product layer 3, which is superior in ductility; thus, as shown in FIG. 15, it is possible to form a joint having the same joining strength as the aluminum alloy base material.

Figure 17B:
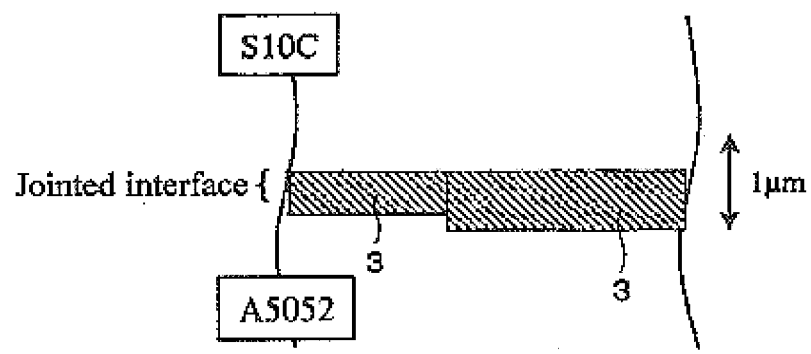
FIG. 17B is a schematic drawing showing the above-mentioned structure.
Figure 18A:
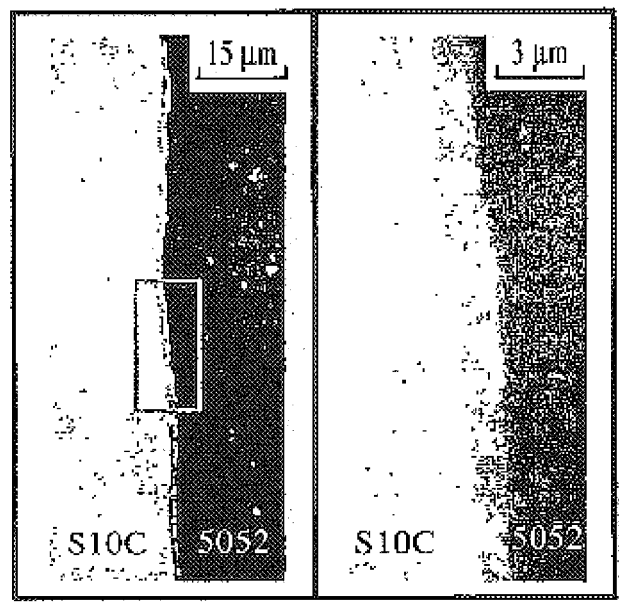
FIG. 18A is an electron microscopy photograph showing a joined interface of a conventional joined structure between a steel product and an aluminum alloy.

In sample 7 shown in FIGS. 17A and 17B, it was confirmed that the crystals of the reaction product continuously grew without gaps on the joined interface. The thickness of the reaction product layer 3 containing these crystal grains varied in a range of 0.5 to 1.0 µm due to the size of grains and local variations.

Figure 18B:
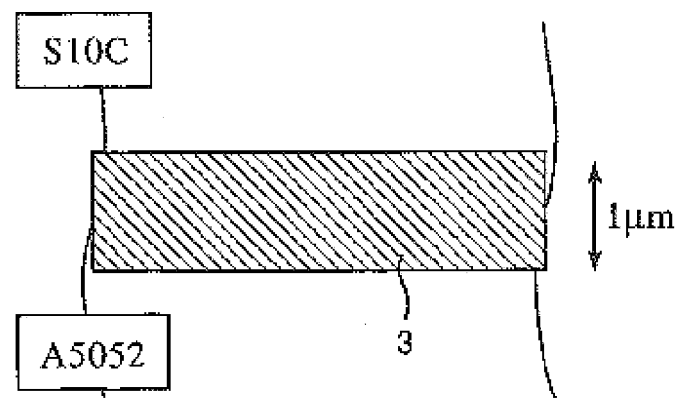
FIG. 18B is a schematic drawing showing the above-mentioned structure.

Moreover, in sample 8 shown in FIGS. 18A and 18B also, in the same manner as sample 7, it was observed that the crystals of the reaction product continuously grew without gaps on the joined interface to form a thick reaction product layer 3. The thickness of this reaction product layer 3 varied in a range of 0.8 to 1.5 µm due to the size of grains and local variations.

In the case of joined structures of samples 7 and 8 having interface structures as shown in FIGS. 17A, 17B, 18A, and 18B, when a crack occurs within a reaction product layer having a low value of toughness to rupturing, the crack is preferentially transmitted through the reaction product layer continuously to cause damage; consequently, this joined structure has a lower strength than that of the joined structure of sample 6 shown in FIGS. 16A and 16B.

Therefore, it is confirmed that in a joined structure of a steel product and an aluminum alloy, it is possible to obtain a joint having high strength that is less susceptible to rupturing from the joined interface by allowing to exist intermittently the reaction product layer generated at the joined interface.

(3) Third Embodiment
Consideration on Friction Time

In order to obtain the joined interface of the present invention, the growth of the reaction product layer must be reduced to a minimum level by starting the upset process immediately after the minimum input required for cleaning the joined interface has been given during a friction process to remove stains, oxides, etc., above the joined face. In particular, in the reaction product layer of the present invention, it is necessary to limit the growth of the reaction product layer to the initial phase. Therefore, a steel product (material: JIS S10C) and an aluminum alloy (material: JIS A5052), which have chemical components shown in Table 1, were formed into a cylindrical steel rod having an outer diameter of 16 mm and a predetermined length and a cylindrical aluminum alloy rod having an outer diameter of 16 mm and a predetermined length, as shown in FIG. 5, so that test pieces were prepared. With respect to these test pieces, the relationship between the friction time and the temperature or the torque in the vicinity of the joined interface in a friction process between these test pieces was observed under the conditions of a frictional pressure of 35 MPa and number of revolutions of 1200 rpm. As a result, the temperature and torque history as shown in FIG. 19 was obtained.

Figure 19:
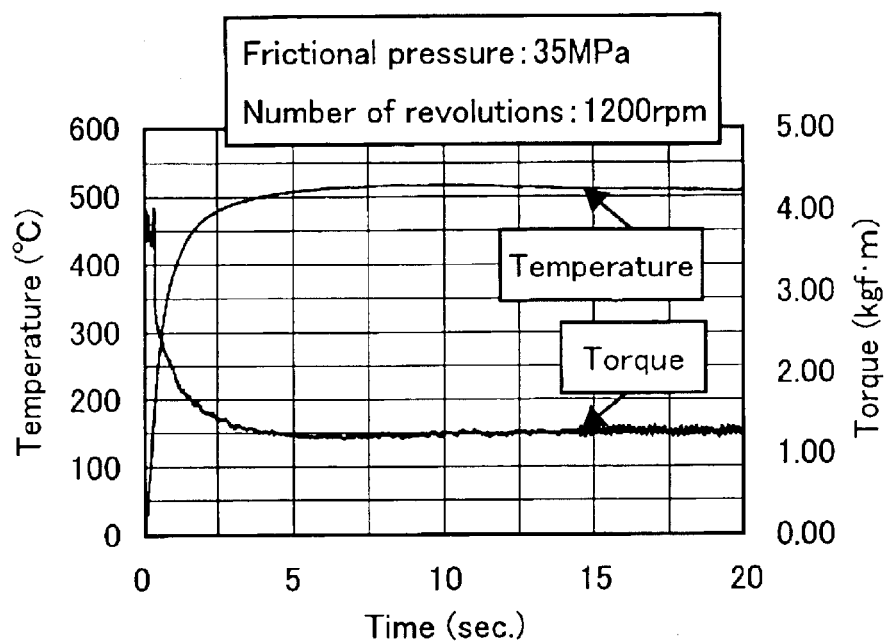
FIG. 19 is a graph showing the relationship among the friction time, the temperature in the vicinity of the joined interface, and the torque in a friction process between the steel product and the aluminum alloy.

As is clearly shown in FIG. 19, a stable temperature and a torque in the vicinity of the joined face were obtained in approximately 3 seconds of friction time. In other words, with respect to the friction welding between the steel product and the aluminum alloy, it was found that a friction time of approximately 3 seconds makes it possible to clean the joined face sufficiently, and a reaction product layer begins to be generated at the joined interface. Moreover, when the frictional heat input was increased by raising the frictional pressure, friction time, etc., from this state, the reaction product layer was developed in accordance with the input quantity of heat, resulting in degradation in the joint strength. Consequently, by carrying out a pressure welding process after a short period of friction process, the input quantity of heat to the joined interface is limited to a minimum and the growth of the reaction product layer is reduced to a minimum; thus, it becomes possible to obtain a joint having high strength.

Preparation of Samples 9 and 10

Next, by setting the frictional pressure respectively to 35 and 50 MPa under the conditions of number of revolutions of 1200 rpm, friction time of 3 seconds, upset pressure of 250 MPa and upset time of 6 seconds, the test pieces of the above-mentioned cylindrical steel product rod and the cylindrical aluminum alloy rod were friction-welded each other in order to prepare a joined structure of a steel product and an aluminum alloy of each of samples 9 and 10. Here, the friction welding process between the cylindrical steel product rod and the cylindrical aluminum rod was carried out by using a conventional brake method.

As shown in FIG. 7, with respect to the joined structure of the steel product and the aluminum alloy thus obtained, the cylindrical aluminum alloy rod side having a lower strength was deformed greatly in a cross-section of the joined portion and was discharged externally as a flange.

Evaluation of Joint Strength

The above-mentioned flange on the joined portion was ground, and the circumference of the joined structure was ground to form a smooth surface so that test pieces each having an outer size of 14 mm without a notch, shown at the upper side in FIG. 8, were prepared. Each of these test pieces was pulled in the length direction so that the joint strength was evaluated.

Figure 20:
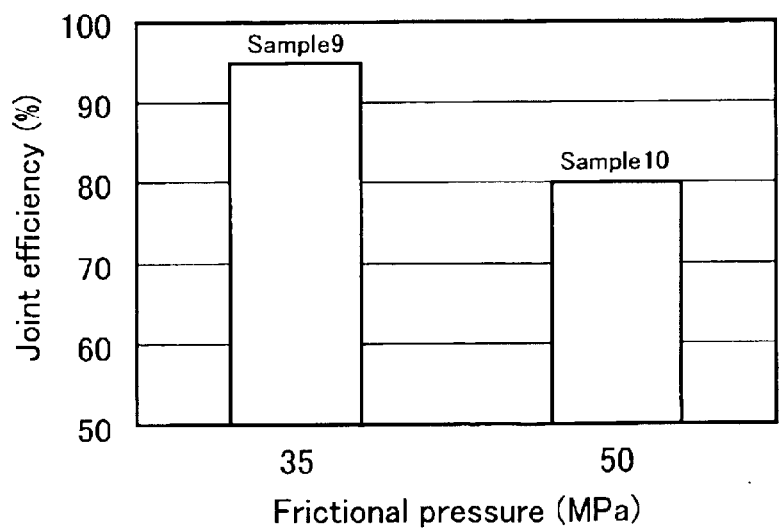
FIG. 20 is a graph showing the relationship between the frictional pressure and the joint efficiency in the forming process of a joined structure between a steel product and an aluminum alloy.

The results of the joint strength evaluation of these joined structures are shown in FIG. 20 as rates (%) of the aluminum member with respect to the base material strength. In the case of sample 9 having a frictional pressure of 35 MPa, the joint strength was the same as the base material strength of the aluminum member. In contrast, in the case of sample 10 having an increased frictional pressure of 50 MPa, the reaction product layer grew too much due to an increase in the input quantity of heat resulting from the increase in the frictional pressure, causing degradation in the joint strength in response to the increase in the frictional pressure.

Evaluation on Interface Structure

Figure 21A:
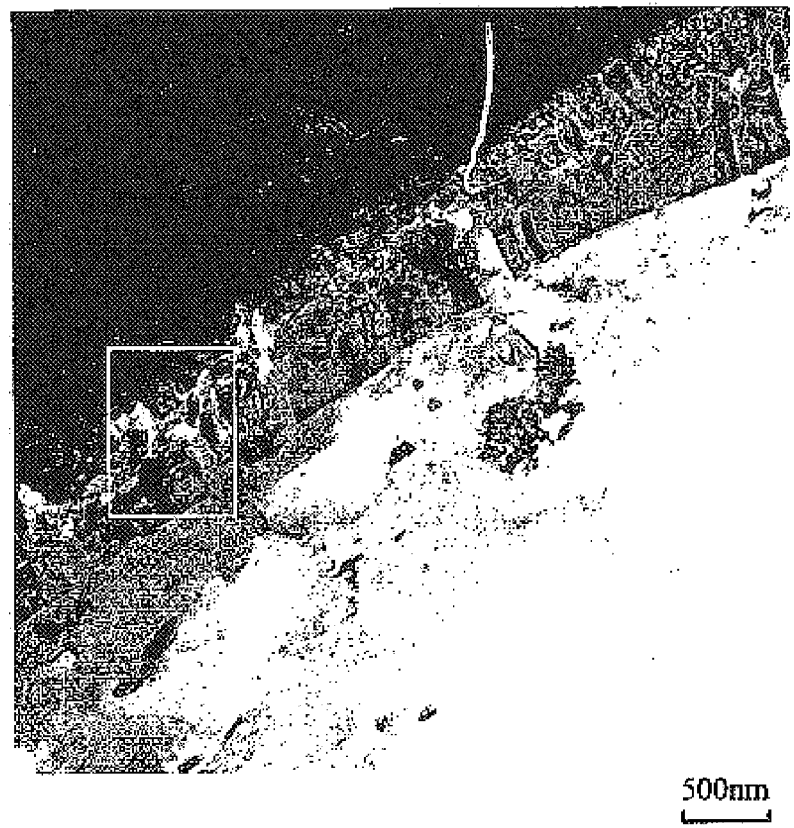
FIG. 21A is an electron microscopy photograph showing a joined interface of a joined structure between a steel product and an aluminum alloy which is an example of a joined structure of different metal materials in accordance with the third embodiment of the present invention.
Figure 21B:
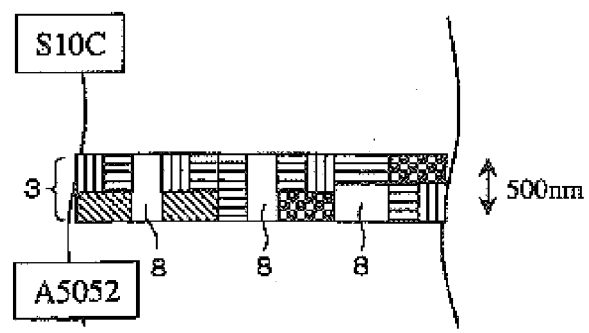
FIG. 21B is a schematic drawing showing the above-mentioned structure.
Figure 22A:
FIG. 22A is an electron microscopy photograph showing a joined interface of a conventional joined structure between a steel product and an aluminum alloy.
Figure 22B:
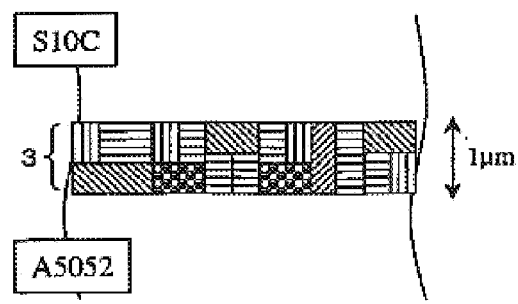
FIG. 22B is a schematic drawing showing the above-mentioned structure.

Moreover, each of the joined structures of samples 9 and 10 obtained as described above was cut in the vertical direction with respect to the joined face as shown in FIG. 10, and the cut surface was mechanically polished by using a polishing disk having diamond abrasive grains having a maximum particle size of 3 µm. Next, in order to obtain a proper permeability of electrons, they were subjected to a sputtering process by Ar atoms in a vacuum and then they were preliminarily subjected to electrolytic polishing in an acidic solution. Samples 9 and 10 having been subjected to these processes were observed under a TEM (transmission-type electron microscope), and the resulting images thereof are shown in FIGS. 21A and 22A. Here, the magnifications of the respective electron microscopy photographs were respectively set to 12,000 times and 20,000 times. FIGS. 21B and 22B are drawings that schematically show these images. Moreover, FIG. 23 shows the joined interface obtained by enlarging the framed area inside the electron microscopy photograph of sample 9 in FIG. 21A.

Figure 23:
FIG. 23 is an electron microscopy photograph showing the joined interface which is an example of the joined structure of different metal materials in accordance with the third embodiment of the present invention, in which the framed area within
Figure 24:
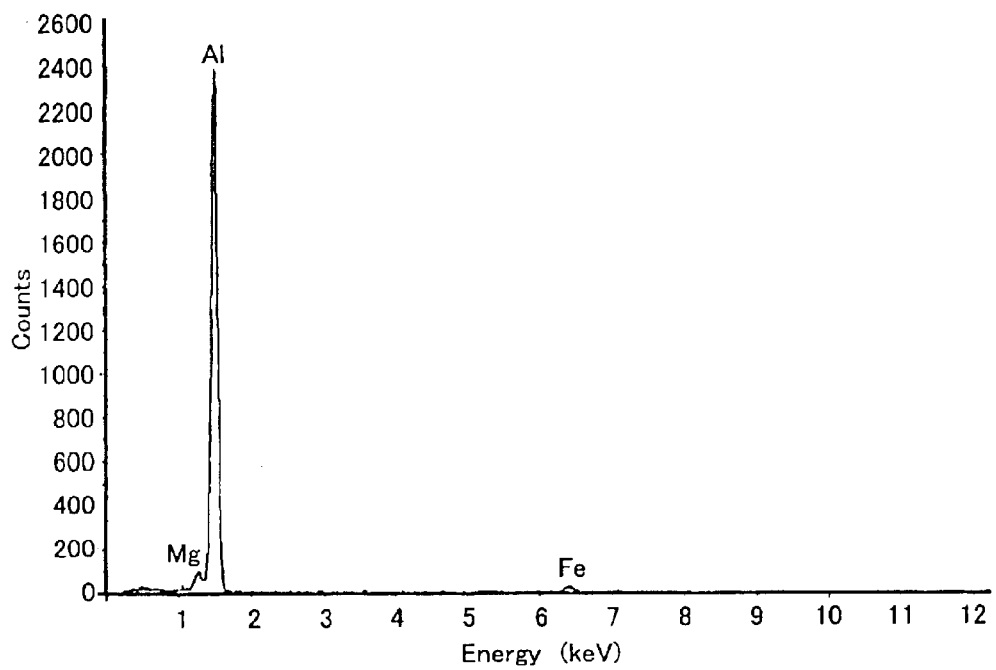
FIG. 24 shows an EDS spectrum of an aluminum alloy base material crystal on the joined interface in a joined structure of different metal materials of the present invention.

Furthermore, EDS spectra were measured at points A to G in the joined interface area shown in FIG. 23, and as the results, component compositions at the respective points in the joined interface area, as shown in Table 2, were obtained. Here, FIG. 24 shows a typical EDS spectrum at point A.

TABLE 2

| | Component composition (atom %) | | | | | |
|---|---|---|---|---|---|---|
| | Al | Fe | Mg | Si | Cr | O |
| Point A | 95.8 | 0.8 | 3.4 | — | — | — |
| Point B | 95.7 | 1.0 | 3.3 | — | — | — |
| Point C | 95.6 | 1.3 | 3.1 | — | — | — |
| Point D | 84.7 | 8.3 | 1.9 | 3.3 | 1.8 | — |
| Point E | 82.4 | 9.8 | 0.9 | 3.5 | 3.4 | — |
| Point F | 72.8 | 17.7 | 0.6 | 0.7 | — | 8.2 |
| Point G | 67.3 | 12.5 | 1.2 | 3.4 | 1.1 | 14.5 |

As is clearly shown by the results of the above-mentioned measurements, in sample 9 of FIGS. 21A and 21B, it was confirmed that an aggregate of the reaction product 3 composed of fine crystal grains having a size of approximately 200 nm square of an intermetallic compound mainly composed of Fe/Al is generated at the joined interface, and that aluminum alloy base material crystals 8 that are equivalent to joined base materials exist in the reaction product layer 3 with some of the crystals penetrating the reaction product layer 3. Considering in more detail, it was confirmed that with respect to each of the areas of points A to C, 90 atom % or more of the component composition is aluminum so that the component of the aluminum alloy base material is considerably maintained, and that, in contrast, with respect to each of the areas of point D to G, an intermetallic compound between an aluminum alloy and a steel product is formed.

In this manner, in sample 9, the aluminum alloy base material crystal 8 (areas of points A to C) exists in the reaction product layer 3 (at areas of points D to G) on the joined interface so as to penetrate the reaction product layer 3; therefore, even if a crack occurs in the reaction product layer 3 having a low value of toughness to rupture, the development of the crack is stopped by the aluminum alloy base material crystal 8 that is superior in ductility so that it is possible to provide a joint having the same joining strength as the aluminum alloy base material as shown in FIG. 20.

In sample 10 shown in FIGS. 22A and 22B, it was confirmed that a crystal grain of the reaction product 3 having a thickness of approximately 200 nm grows vertically with respect to the joined interface due to an increase in the input quantity of heat resulting from the increase in the frictional pressure so that the crystal grain of the reaction product 3 grows continuously on the joined interface without gaps. In contrast, in the case of the aluminum alloy base material crystal that exists in sample 9 in FIGS. 21A and 21B, the above-mentioned growth of the reaction product layer 3 progresses extremely to completely form an intermetallic compound with the steel product. The thickness of the reaction product layer 3 including the crystal grain varied in a range of 0.8 to 1.5 µm due to size of the crystals and local variations. In the case of a joined structure having an interface structure of this type, there is a higher probability of cracks occurring within the intermetallic compound layer having a low value of toughness to rupture, and once a crack occurs, it is preferentially transmitted through the intermetallic compound layer continuously to cause damage; consequently, this joined structure has a lower strength than that of the joined structure of sample 9 shown in FIGS. 21A and 21B.

Therefore, it is confirmed that, in a joined structure between a steel product and an aluminum alloy, it is possible to provide a joint having high strength that is less susceptible to rupturing from the joined interface by allowing the aluminum alloy base material crystals to exist in the reaction product layer to be generated on its joined interface.

(4) Fourth Embodiment
Consideration on Friction Time

In order to obtain the joined interface of the present invention, the growth of the reaction product layer must be reduced to a minimum level by starting the upset process immediately after the minimum input required for cleaning the joined interface has been given during a friction process so as to remove stains from the joined interface and oxides from the surface of one side of the base materials with this oxide layer slightly remaining thereon. Therefore, a steel product (material: JIS S10C) and an aluminum alloy (material: JIS A5052), which have chemical components shown in Table 1, were formed into a cylindrical steel rod having an outer diameter of 16 mm and a predetermined length and a cylindrical aluminum alloy rod having an outer diameter of 16 mm and a predetermined length, as shown in FIG. 5, so that test pieces were prepared. With respect to these test pieces, the relationship between the friction time and the temperature in the vicinity of the joined interface in a friction process between these test pieces was observed under the conditions of a frictional pressure of 20 MPa and number of revolutions of 1200 rpm. As a result, the temperature variation as shown in FIG. 6 was obtained.

As is clearly shown in FIG. 6, a stable temperature in the vicinity of the joined face was obtained in approximately 3 seconds of friction time. In this initial stage, the oxide layer on the aluminum alloy surface has been removed by a plastic flow during a friction process with only the oxide layer remaining on the steel product. Moreover, at this time, magnesium contained in the aluminum alloy reduces one portion of this oxide to form a magnesium oxide that is contained in the oxide layer. Therefore, when the two joining materials are joined under joining conditions shown in Table 3 with the friction process having a shortened time, a residual oxide layer on the surface of a steel product or a magnesium oxide layer formed by the reduction thereof is located on the joined interface so that the joining strength becomes the same as that of the aluminum alloy member.

TABLE 3

| | |
|---|---|
| Frictional pressure | 20 Mpa |
| Friction time | 3 seconds |
| Number of revolution | 1200 rpm |
| Upset pressure | 250 Mpa |
| Upset time | 6 seconds |

Preparation of Samples 11 to 13

Next, by setting the frictional pressure respectively to 10, 20, and 50 MPa under the conditions of number of revolutions of 1200 rpm, friction time of 3 seconds, upset pressure of 250 MPa, and upset time of 6 seconds, the test pieces of the above-mentioned cylindrical steel product rod and the cylindrical aluminum alloy rod were friction-welded each other to prepare a joined structure of a steel product and an aluminum alloy of each of samples 11 to 13. Here, the friction welding process between the cylindrical steel product rod and the cylindrical aluminum rod was carried out by using a conventional brake method.

As shown in FIG. 7, with respect to the joined structure of the steel product and the aluminum alloy thus obtained, the cylindrical aluminum alloy rod side having a lower strength was deformed greatly in cross-section of the joined portion and was discharged externally as a flange.

Evaluation of Joint Strength

The above-mentioned flange on the joined portion was ground, and the circumference of the joined structure was ground to form a smooth cylindrical shape. Moreover, notches having a depth of 1.4 mm were formed on the circumferential surface of the joined interface so that test pieces each having a set stress concentration rate of 2.0, shown in FIG. 8, were also prepared. These test pieces with notches were used so as to carry out more strict evaluation on the joined interface. Each of these test pieces was pulled in the length direction so that the joint strength was evaluated.

Figure 25:
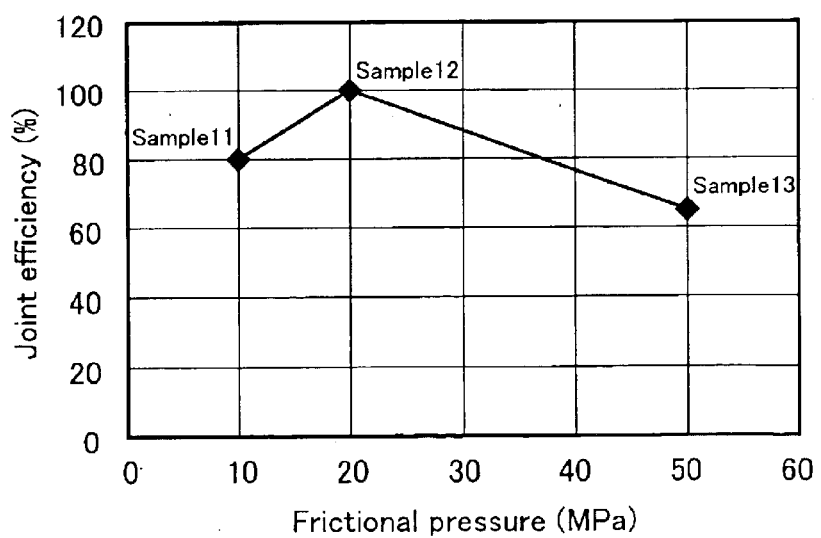
FIG. 25 is a graph showing the relationship between the frictional pressure and the joint efficiency in the forming process of a joined structure between a steel product and an aluminum alloy.

The results of the joint strength evaluation of these joined structures are shown in FIG. 25 as rates (%) of the aluminum member with respect to the base material strength. In the case of sample 11 having a frictional pressure of 10 MPa, the joint strength was low because the joined face was not cleaned sufficiently and welding between the joined members was insufficient. In contrast, in the case of sample 12 having a frictional pressure of 20 MPa, the joint strength was the same as the base material strength of the aluminum member. In the case of the sample 13 having a frictional pressure exceeding 50 MPa, the joint strength was lowered due to the progress of the growth of the reaction product layer on the joined interface.

Evaluation on Interface Structure

Figure 26A:
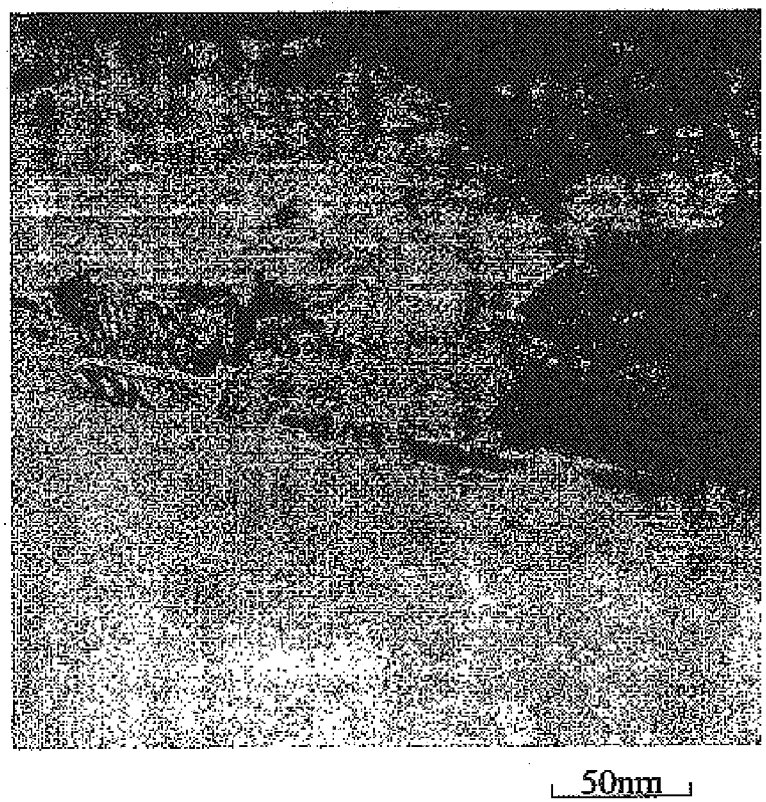
FIG. 26A is an electron microscopy photograph showing a joined interface of a joined structure between a steel product and an aluminum alloy which is an example of a joined structure of different metal materials in accordance with the fourth embodiment of the present invention.
Figure 27A:
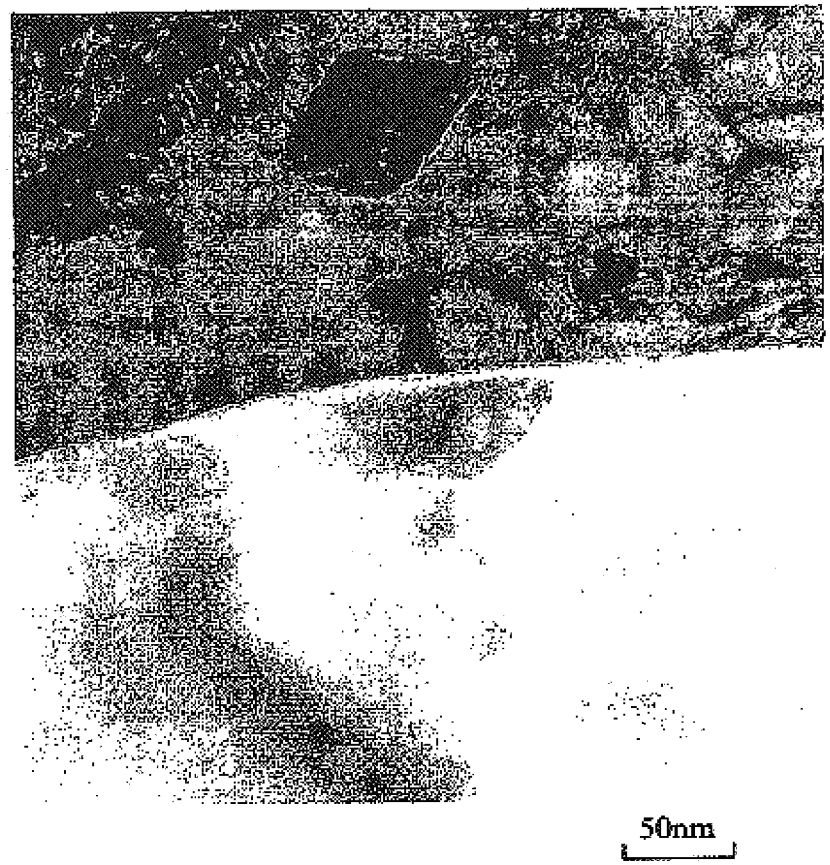
FIG. 27A is an electron microscopy photograph showing a joined interface of a joined structure between a steel product and an aluminum alloy which is another example of a joined structure of different metal materials in accordance with the fourth embodiment of the present invention.
Figure 27B:
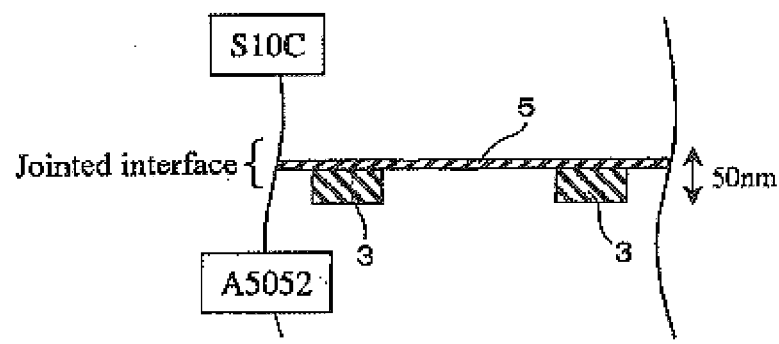
FIG. 27B is a schematic drawing showing the above-mentioned structure.
Figure 28A:
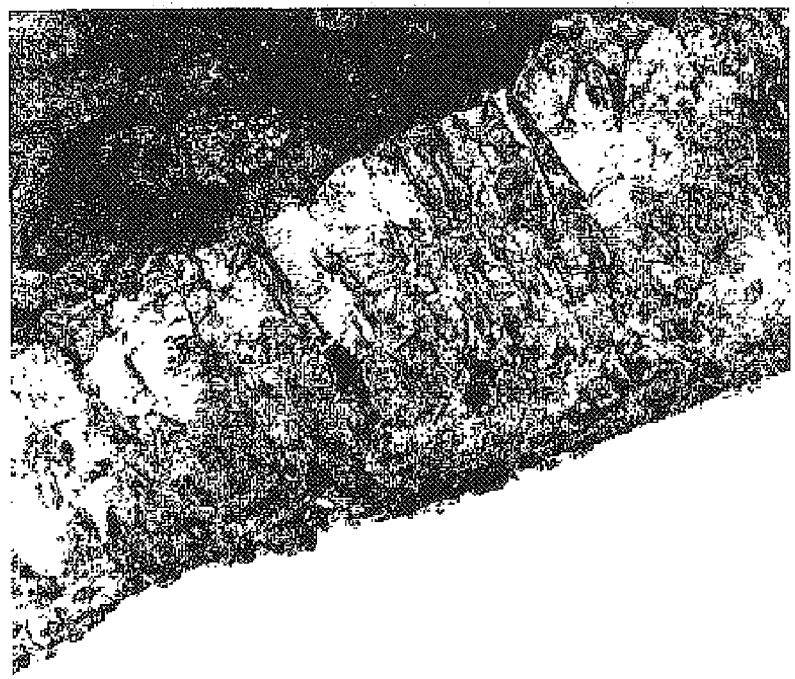
FIG. 28A is an electron microscopy photograph showing a joined interface of a conventional joined structure between a steel product and an aluminum alloy.
Figure 28B:
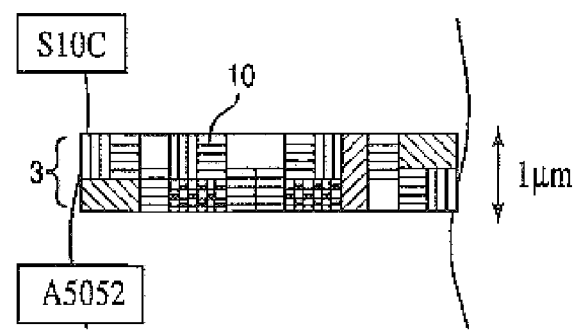
FIG. 28B is a schematic drawing showing the above-mentioned structure.

Moreover, each of the joined structures of samples 11 to 13 obtained as described above was cut in the vertical direction with respect to the joined face as shown in FIG. 10, and the cut surface was mechanically polished by using a polishing disk having diamond abrasive grains having the maximum particle size of 3 μm. Next, in order to obtain a proper permeability of electrons, they were subjected to a sputtering process by Ar atoms in a vacuum and then, they were preliminarily subjected to electrolytic polishing in an acidic solution. These samples 11 to 13 having been subjected to these processes were observed under a TEM (transmission-type electron microscope), and the resulting images thereof are shown in FIGS. 26A, 27A, and 28A, respectively. Here, the magnifications of the respective electron microscopy photographs were respectively set to 120,000 times, 150,000 times and 20,000 times. Moreover, is FIGS. 26B, 27B, and 28B are drawings that schematically show these images.

Figure 26B:
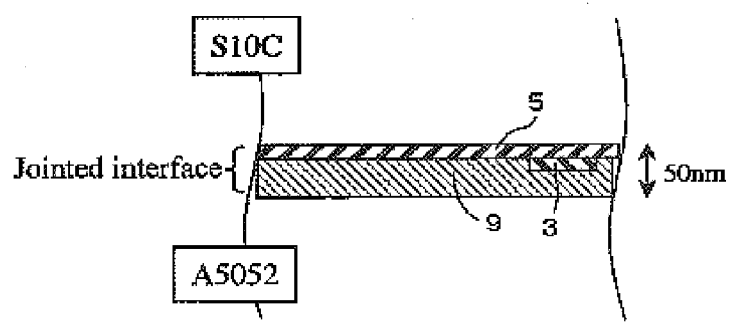
FIG. 26B is a schematic drawing showing the above-mentioned structure.

In sample 11 shown in FIGS. 26A and 26B, it is confirmed that, in addition to the oxide layer 5 located on the steel product side on the joined interface, an oxide layer 9, which is thicker than the oxide layer 5, exists on the aluminum alloy side of the joined interface. In this structure, since the frictional pressure in the friction process is as low as 10 MPa, an oxide layer 9 existing on the surface of the aluminum alloy is not sufficiently cleaned and discharged and is pressure-welded with an oxide layer 5 existing on the surface of the steel product, and therefore, two oxide layers are formed. The total thickness of the layer including the oxide layer 5 and oxide layer 9 was approximately 50 nm.

Moreover, a reaction product 3 made of crystals of an intermetallic compound mainly consisting of Fe/Al was located in the form of dots along the joined interface. The size of the reaction product 3 was approximately 50 nm in width and 10 nm in thickness.

In this manner, in sample 11, since the generation of the reaction product 3 on the joined interface is restricted so as to only form a thin layer, there is a very low probability that a crack will occur and develop therein; however, since thick oxide layers 5 and 9 including two layers exist on the joined interface and the welding property between the two oxides is not very good, damage occurs due to the joined interface between the two oxide layers, and as shown in FIG. 25, the joining strength thereof becomes lower than that of the aluminum alloy member.

In sample 12 shown in FIGS. 27A and 27B, the oxide layer which had existed on the surface of the steel product still remained slightly to form a very thin oxide layer 5 on the steel product side of the joined interface, and a reaction product 3 made of crystals of an intermetallic compound mainly consisting of Fe/Al was formed and was located in the form of dots in contact with the oxide layer 5. The oxide layer 5 was approximately 10 nm in thickness, and the reaction product 3 was approximately 50 nm in thickness and 100 nm in width.

Figure 29:
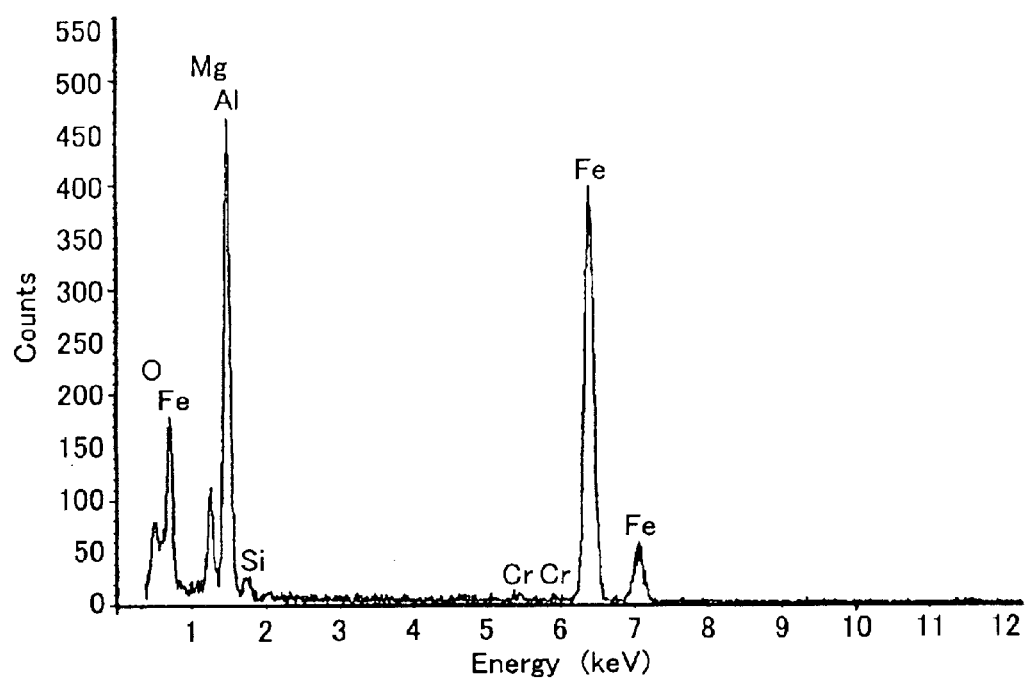
FIG. 29 shows an EDS spectrum of an oxide layer in a joined structure of different metal materials of sample 12.

Moreover, with respect to the oxide layer 5 on the steel product side in sample 12, the EDS spectrum thereof was measured, and FIG. 29 shows the resulting spectrum. As is clearly shown by these results, it was confirmed that the oxide in the layer also contains those reduced by magnesium dispersed from the aluminum alloy.

In this manner, in sample 12 shown in FIGS. 27A and 27B, the oxide layer 5 is formed as a very thin layer so as not impact adverse effects on the welding property and joining strength between the steel product and the aluminum alloy, and the reaction product 3 is located at the joined interface in the form of dots; therefore, even if a crack occurs within the reaction product 3 having a low value of toughness to rupture, the development of the crack is stopped by the aluminum alloy having a superior ductility that is located in the intermittent portion of the reaction product 3; thus, as shown in FIG. 25, it is possible to provide a joint having a joining strength as high as that of the aluminum alloy.

In sample 13 shown in FIGS. 28A and 28B, all of the oxide layer on the joined interface was cleaned and removed so that only the thick reaction product layer 3 that had grown large was observed. The area indicated by reference numeral 10 in the reaction product layer 3 represents a typical reaction product in which crystal grains having a thickness of approximately 200 nm have grown vertically with respect to the joining interface. These crystals of the reaction product have grown continuously on the joined interface without gaps. The thickness of the reaction product layer 3 including these crystal grains varies in a range between 0.8 to 1.5 μm due to sizes of the grains and local variations. In the case of a joined structure having an interface structure of this type, there is a higher probability of cracks occurring within the intermetallic compound layer having a low value of toughness to rupture, and once a crack occurs, it is preferentially transmitted through the intermetallic compound layer continuously to cause damage; consequently, this joined structure has a lower strength than that of the joined structure of sample 12 shown in FIGS. 27A and 27B.

Therefore, it is confirmed that, in a joined structure between a steel product and an aluminum alloy, it is possible to provide a joint having high strength that is less susceptible to rupturing from the joined interface by allowing an oxide layer having a thickness of 1 to 30 nm to exist on the joined interface.

What is claimed is:

1. A joined structure of different metal materials comprising:
   a first member composed of a first metal material;
   a second member composed of a second metal material; and
   a reaction product layer generated in a joined interface between the first and second metal members due to friction welding,
   wherein the first and second metal materials are different, and
   the reaction product layer has a thickness ranging from greater than 0 µm to less than or equal to 0.5 µm.

2. A joined structure of different metal materials, comprising:
   a first member composed of a first metal material;
   a second member composed of a second metal material; and
   a reaction product layer generated in a joined interface between the first and second metal materials,
   wherein the first and second metal materials are different and the reaction product layer has a thickness ranging from greater than 0 µm to less than or equal to 0.5 µm,
   wherein the reaction production layer is disposed intermittently on the joined interface.

3. A joined structure of different metal materials, comprising:
   a first member composed of a first metal material;
   a second member composed of a second metal material; and
   a reaction product layer generated in a joined interface between the first and second metal materials,
   wherein the first and second metal materials are different and the reaction product layer has a thickness ranging from greater than 0 µm to less than or equal to 0.5 µm,
   wherein the reaction product layer contains a base material crystal consisting of base material atoms of 90 atom % or more.

4. The joined structure of different metal materials according to claim 3, wherein the base material crystal penetrates the reaction product layer.

5. A joined structure of different metal materials, comprising:
   a first member composed of a first metal material;
   a second member composed of a second metal material; and
   a reaction product layer generated in a joined interface between the first and second metal materials,
   wherein the first and second metal materials are different and the reaction product layer has a thickness ranging from greater than 0 µm to less than or equal to 0.5 µm,
   wherein an oxide layer is placed on said joined interface.

6. The joined structure of different metal materials according to claim 5, wherein the oxide layer has a thickness in a range of 1 to 30 nm.

7. The joined structure of different metal materials according to claim 5, wherein the oxide layer is made from at least one of an oxide located on the surface of a joined member and an oxide generated during a joining process.

8. The joined structure of different metal materials according to claim 6, wherein the oxide layer is made from at least one of an oxide located on the surface of a joined member and an oxide generated during a joining process.

9. A joined structure of different metal materials, comprising:
   a first member composed of a first metal material;
   a second member composed of a second metal material; and
   a reaction product layer generated in a joined interface between the first and second metal materials,
   wherein the first and second metal materials are different and the reaction product layer has a thickness ranging from greater than 0 µm to less than or equal to 0.5 µm,
   wherein the different metal materials are composed of a first member made of a steel and a second member made of an aluminum alloy.

10. The joined structure of different metal materials according to claim 2, wherein the different metal materials are composed of a first member made of a steel and a second member made of an aluminum alloy.

11. The joined structure of different metal materials according to claim 3, wherein the different metal materials are composed of a first member made of a steel and a second member made of an aluminum alloy.

12. The joined structure of different metal materials according to claim 4, wherein the different metal materials are composed of a first member made of a steel and a second member made of an aluminum alloy.

13. The joined structure of different metal materials according to claim 5, wherein the different metal materials are composed of a first member made of a steel and a second member made of an aluminum alloy.

14. The joined structure of different metal materials according to claim 6, wherein the different metal materials are composed of a first member made of a steel and a second member made of an aluminum alloy.

15. The joined structure of different metal materials according to claim 7, wherein the different metal materials are composed of a first member made of a steel and a second member made of an aluminum alloy.

16. The joined structure of different metal materials according to claim 8, wherein the different metal materials are composed of a first member made of a steel and a second member made of an aluminum alloy.

* * * * *